US012502240B2

(12) United States Patent
Do

(10) Patent No.: US 12,502,240 B2
(45) Date of Patent: Dec. 23, 2025

(54) ADJUSTABLE TATTOO STAND

(71) Applicant: Ghost Tattoo Co LLC, Naples, FL (US)

(72) Inventor: Tyler Do, Pasadena, CA (US)

(73) Assignee: GHOST TATTOO CO LLC, Naples, FL (US)

( * ) Notice: Subject to any disclaimer, the term of this patent is extended or adjusted under 35 U.S.C. 154(b) by 48 days.

(21) Appl. No.: 18/509,210

(22) Filed: Nov. 14, 2023

(65) Prior Publication Data
US 2024/0156560 A1    May 16, 2024

Related U.S. Application Data

(60) Provisional application No. 63/383,624, filed on Nov. 14, 2022.

(51) Int. Cl.
*A61B 50/15*    (2016.01)
*F16M 11/28*    (2006.01)

(52) U.S. Cl.
CPC ............. *A61B 50/15* (2016.02); *F16M 11/28* (2013.01)

(58) Field of Classification Search
CPC ................................ A61B 50/15; F16M 11/28
See application file for complete search history.

(56) References Cited

U.S. PATENT DOCUMENTS

| | | | | |
|---|---|---|---|---|
| 5,005,590 A | * | 4/1991 | Eldridge, Jr. .......... | A61B 50/33 206/370 |
| 5,366,275 A | * | 11/1994 | Sulzer .................... | A47C 7/004 248/161 |
| 5,690,307 A | * | 11/1997 | Joyce ..................... | F16M 11/40 248/205.2 |
| 6,840,180 B2 | * | 1/2005 | Ulmer .................. | A47B 13/023 108/150 |
| 7,104,201 B2 | * | 9/2006 | Comeaux ............... | A61B 50/13 108/90 |
| 7,336,258 B1 | * | 2/2008 | Goetsch .................. | G06F 3/039 248/278.1 |
| 8,020,829 B1 | * | 9/2011 | Tamayori ............... | F16M 13/00 108/144.11 |
| 9,377,156 B2 | * | 6/2016 | Wong ................. | F16M 11/2092 |
| 10,100,971 B2 | * | 10/2018 | Yun ......................... | H04M 1/04 |
| 10,413,043 B2 | * | 9/2019 | King .................... | F16M 11/041 |
| 10,816,131 B2 | * | 10/2020 | Lee ........................ | G06F 1/1607 |
| 11,224,279 B2 | | 1/2022 | Fox | |
| 11,771,195 B1 | | 10/2023 | Fox | |
| 12,426,694 B2 | | 9/2025 | Fox | |
| 2001/0035479 A1 | * | 11/2001 | Roebuck ................ | F16M 11/28 248/910 |

OTHER PUBLICATIONS

Alisha Fox, "Mobile Color and Style Application Device", U.S. Appl. No. 63/159,264, filed Mar. 10, 2021, 70 pages.
Alisha Fox, "Mobile Color and Style Application Device", U.S. Appl. No. 62/830,116, filed Apr. 5, 2019, 42 pages.

* cited by examiner

*Primary Examiner* — Anita M King
(74) *Attorney, Agent, or Firm* — Womble Bond Dickinson (US) LLP

(57) ABSTRACT

An adjustable tattoo stand may include a mounting plate and second plate that is attachable and detachable from the mounting plate. The stand may be used as an armrest or as a mayo tray.

20 Claims, 11 Drawing Sheets

ADJUSTABLE TATTOO STAND

RELATED APPLICATIONS

This application claims priority to U.S. Provisional 63/383,624 filed on Nov. 14, 2022, which is hereby incorporated by reference in its entirety.

FIELD

Embodiments of the present disclosure relate to tattoo equipment. More particularly, embodiments of the disclosure relate to a tattoo stand with modular features to aid in the tattoo process.

BACKGROUND

A permanent tattoo is a form of body modification made by injecting tattoo ink into a person's skin. A tattoo artist may create these designs using various tattooing equipment through one or more tattooing processes in which the tattoo artist injects the ink into the subject. Depending on the complexity of a tattoo, the tattoo process may take hours or longer.

SUMMARY

In some aspects, an adjustable tattoo stand may include a tray and disposable cover that may include multiple compartments for holding various tattoo equipment such as ink, a tattoo machine, swabs, and other tattoo equipment. The tray may include a disposable tray cover.

In an aspect, an adjustable tattoo stand may include an arm rest. The arm rest may have an angle adjustment bracket that holds the arm rest fixed at various different angles. The height of the stand may be adjusted as well. In some examples, the height may be adjusted with a foot pedal, to provide handless height control.

In an aspect, the same stand may serve as an arm rest or tattoo stand, with an interchangeable arm rest plate or tray plate. In another aspect, the arm rest stand and tattoo stand may be different stands.

In an aspect, a stand for tattoo operation, comprises a base; a shaft attached to the base at a bottom portion of the shaft; a mounting plate fixed to a top portion of the shaft, the mounting plate comprising one or more magnets; and a second plate, comprising a magnetic material, attachable and detachable from the mounting plate.

In an embodiment, the second plate comprises an armrest plate, and the stand further comprises: a first angle adjustable bracket, coupled to the shaft and the mounting plate, the first angle adjustable bracket including a first plurality of locking positions, each corresponding to a respective pitch angle of the armrest plate upon setting of the first angle adjustable bracket. The stand may further comprise a second angle adjustable bracket, coupled to the shaft and the mounting plate, the second angle adjustable bracket including a second plurality of locking positions that each correspond to a respective rotational angle of the armrest plate upon setting of the second angle adjustable bracket. The first angle adjustable bracket and the second angle adjustable bracket may be adjustable in response to a force, and are fixed in place in response to a removal of the force. The first angle adjustable bracket may comprise a respective notch associated with each of the first plurality of locking positions, wherein in response to the force, the respective notch disengages with a protruding member to release the first angle adjustable bracket, and in response to the removal of the force, the protruding member becomes arranged in the respective notch to engage with the respective notch to fix the first angle adjustable bracket in place. The second angle adjustable bracket may comprise a top rotating interface and bottom rotating interface with an interlocking shape, wherein in response to the force, the top rotating interface and bottom rotating interface separate to release the second angle adjustable bracket. The armrest plate may comprise a planar surface having a rectangular shape with at least a width of 10 in and a length of 15 in. The armrest plate may comprise a planar surface having a square shape with at least a width of 12 in. The armrest plate may comprise one or more soft materials (e.g., foam, cloth, etc.) that may be arranged at a top surface of the armrest plate. The armrest plate may serve as an armrest pad.

In an embodiment, the second plate may comprise a tray shape comprising raised walls along edges of the tray shape. The stand may comprise a disposable cover that is attachable and removable from the second plate. The disposable cover may comprise a plurality of recesses. The plurality of recesses may comprise a first elongated recess having at least a length of 3 in, and at least a width of 0.3 in. The plurality of recesses may comprise a second plurality of round recesses ranging between 0.5 and 1 in in diameter. The plurality or recesses may comprise one or more third recesses comprising a first recess portion that is fluidly connected to a plurality of second recess portions, wherein each of the second recess portions have a geometry that is complementary in shape to a tattoo needle cartridge to hold the tattoo needle cartridge in the one or more third recesses. The plurality of recesses may comprise at least a depth of 0.3 in. The tray shape may comprise a width of at least 12 in. and a length of at least 12 in. The tray shape may comprise at least one of: rectangle, a square, an oval, a heart, a coffin (e.g., a hexagon), or a circle shape.

The tattoo stand (either operating as an armrest or a mayo tray) may comprise a height actuator. For example, the stand may include a pedal, coupled to the base; and an actuator, coupled to the actuator, wherein in response to a depression of the pedal, the actuator generates a force that extends a length of the shaft that increases a height of the stand. The actuator may comprise a gas strut comprising a piston that is coupled to the shaft. The base may have a shelf or a plurality of feet that extend from a center axis of the base. The base may extend out with a length that may be determined to securely support the stand and maintain its upright position.

Other technical features may be readily apparent to one skilled in the art from the following figures, descriptions, and claims.

BRIEF DESCRIPTION OF THE DRAWINGS

The aspects are illustrated by way of example and not by way of limitation in the drawings in which like references may indicate similar elements. It should be noted that reference to "an" or "one" aspect of this disclosure are not necessarily to the same aspect, and they mean at least one. Also, in the interest of conciseness and reducing the total number of figures, a given figure may be used to illustrate the features of more than one aspect, and not all elements in the figure may be required for a given aspect. It should be understood that some of the embodiments shown may be combined with other embodiments even if not shown as such in each figure.

DETAILED DESCRIPTION

Figure 1A:
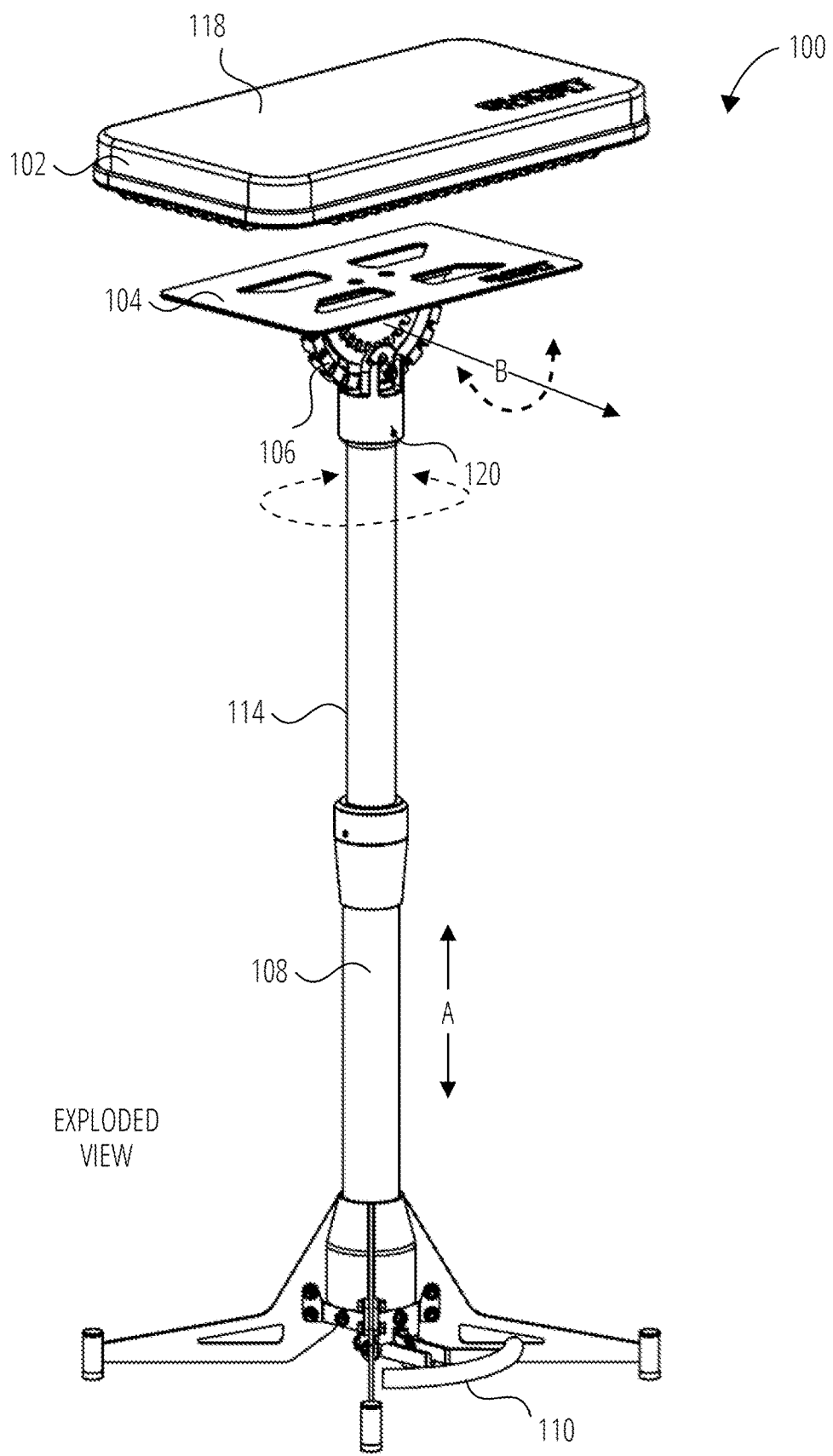
FIG. 1A, FIG. 1B, FIG. 1C, and FIG. 1D show an adjustable tattoo stand for a tattoo procedure serving as an armrest, in accordance with some aspects.
Figure 1B:
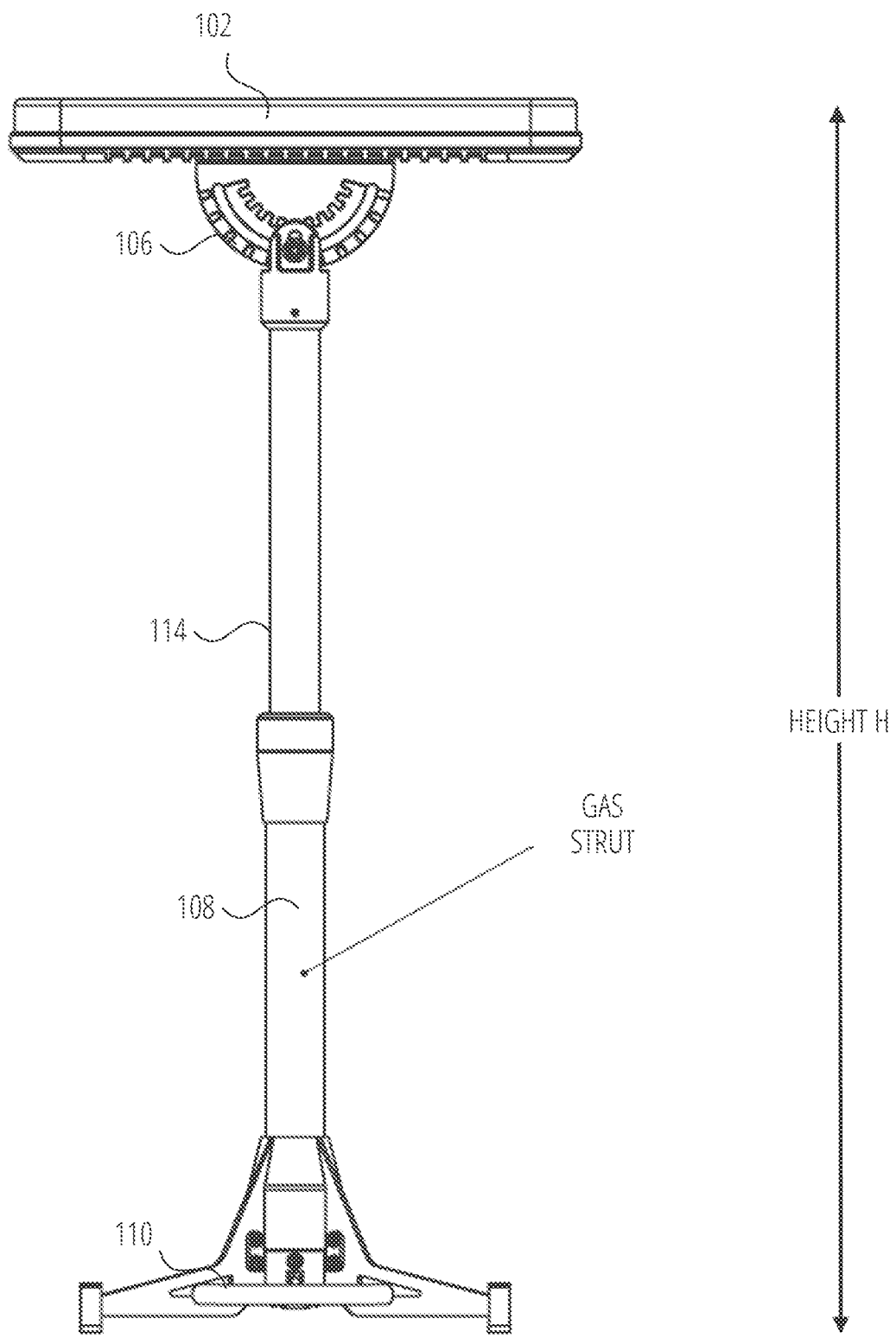
Figure 1C:
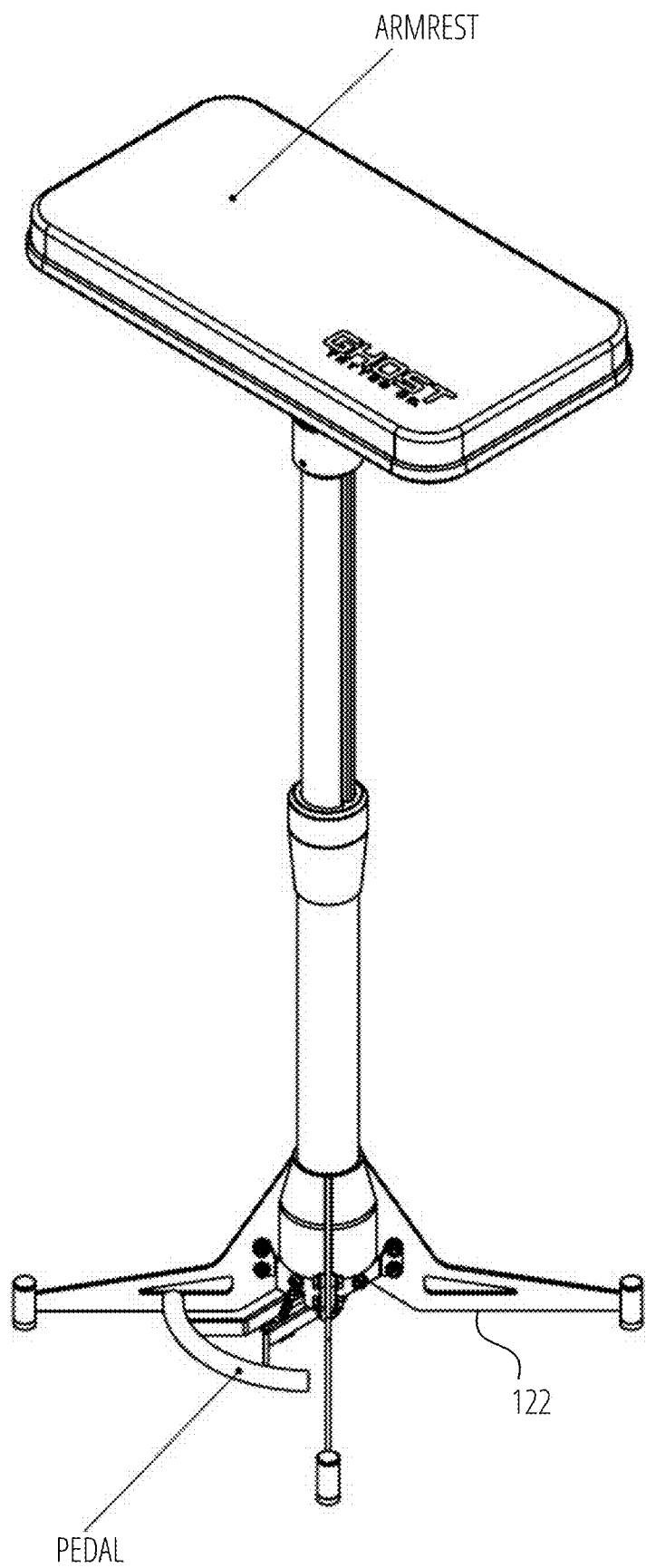
Figure 1D:
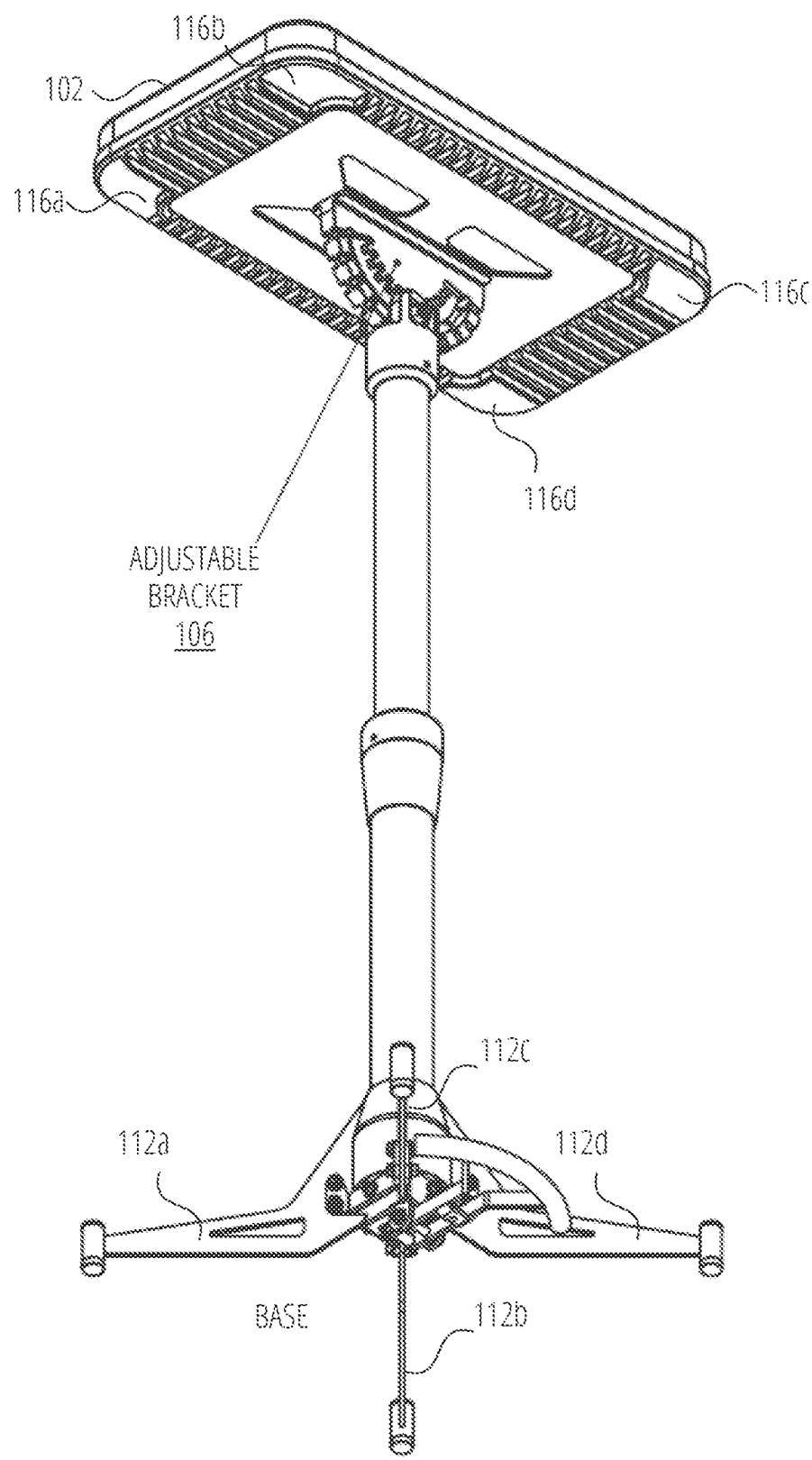

The tattooing process may be a lengthy one. Throughout a tattoo process, a person receiving the tattoo (e.g., a subject) may need to hold relatively still so that a tattoo artist may work upon the subject. A subject may sit or lay down in a comfortable position. The tattoo artist may arrange the subject's body in a manner that allows access and reach to the subject's anatomy on which the tattoo is to be placed. The arms (e.g., shoulders, forearms, elbows, etc.) are a popular place for a tattoo. A subject may wish to lay her arm on a stand in a position where the tattoo artist can access her arm with the tattoo gun. Depending on the size of the tattoo, the position of the arm or other body part may need to be adjusted during the operation. Thus, there is a desire for tattoo equipment to be adjustable to hold and steady a subject's arm or other body part during the tattoo process.

Further, tattoo equipment should be within reach of a tattoo artist. It may be beneficial for the tattoo equipment to have an adjustable height so that the tattoo artist may optimally place the equipment for ease of access. Further, it may be beneficial for a stand to have multiple purposes, such as to hold tattoo equipment, or to steady a subject's body part during a tattoo procedure. A tattoo shop can have multiple such stands that can be used for such a dual purpose, so that a tattoo artist can simply commandeer a nearby stand to hold tattoo equipment, or commandeer another stand to steady the subject's body (e.g., as an armrest).

FIG. 1A, FIG. 1B, FIG. 1C, and FIG. 1D show an adjustable tattoo stand 100 for a tattoo procedure, in accordance with some aspects. The tattoo stand 100 may be used as an arm rest to hold a user's arm steady (e.g., a person receiving a tattoo) during a tattoo procedure.

Generally, the tattoo stand 100 may comprise a base 122, a shaft 114 coupled to the base 122, a mounting plate 104, and a second plate 102, which may be referred to as an armrest plate 102, The mounting plate 104 may comprise one or more magnets (e.g., magnets 116a magnet 116b, magnet 116c, magnet 116d) that attract and hold armrest plate 102 to the top of tattoo stand 100. The armrest plate 102 may be attachable and detachable from mounting plate 104, solely by the magnets (e.g., without buttons, fasteners, clips, fastening bolts, screws, etc.) and fit.

Armrest plate 102 may have a substantially flat planar surface, as shown. The planar surface 118 may be rectangular or oval in shape. In an example, the planar surface 118 may range from 5"×9" to 10"×18", or larger. The planar surface may have dimensions to accommodate a human forearm or other human body parts of various size.

The mounting plate 104 may be fixed to an angle adjustable bracket 106. The adjustable bracket 106 may be rotatable about an axis B that is roughly parallel to the ground. The adjustable bracket 106 may include one or more notches, a slot, a latch, a knob, a spring-loaded lock, a shaft, or other mechanical locking mechanism to move or hold it in place at a desired angle. One of the angles may place the planar surface 118 parallel relative to the ground when the stand 100 stands on the ground. When rotating about axis B, the pitch angle of the planar surface 118 may adjust (as opposed to roll or yaw). In another example, a second angle adjustable bracket 120 may additionally adjust the rotation of the planar surface 118 about an axis of the shaft 114 of the tattoo stand 100. The angle adjustable bracket 106 may include a first plurality of locking positions, each corresponding to a respective pitch angle of the armrest plate upon setting of the first angle adjustable bracket. Similarly, second angle adjustable bracket 120, coupled to the shaft and the mounting, may include a second plurality of locking positions that each correspond to a respective rotational angle of the armrest plate upon setting of the second angle adjustable bracket. Details regarding angle adjustable brackets are further described in other sections.

The stand 100 may include a shaft portion 114 that gives the stand its height. The shaft portion 114 may include a height adjustment actuator 108 that adjusts the height of the stand and the shaft 114 (e.g., along axis A). In some examples, the height adjustment actuator 108 may include a gas strut. Gas struts are mechanical devices that include compressed gas that provide a controlled amount of force. The compressed gas stores and releases energy which may be transferred via a sliding piston (not shown) in actuator 108. Other actuator mechanisms (e.g., springs, pneumatics, etc.) may be implemented in other embodiments. The actuator 108 may be controlled by a foot lever 110. In an example, the height of the stand may range from 24" to 44".

A user may depress the foot lever 110 to raise or lower the height of arm rest 102. The bottom portion of the stand 100 may be referred to as a base 122. Base 122 may include one or more legs such as 112a, 112b, 112c, 112d that extend outward from the center (e.g., the shaft). In another embodiment, rather than legs, base 122 may include a continuous shelf that extends outward radially from the center. The legs will maintain contact with the ground while supporting the stand 100 during use. In some examples, as shown, the legs may extend radially out away from the shaft 114 of the stand. The actuator may be positioned towards the base 122 of the stand 100. Similarly, the foot lever 110 may be arranged at the base 122 of the stand 100, so that it may be operated naturally by the user. Components of the stand comprise a metal, wood, polymer/plastic, or other suitably stiff and strong material. The foot lever 110 may be operated by a downward force which may cause actuator 108 to provide an upward force (e.g., by extension of a piston) to extend the height of shaft 114. Shaft 114 may comprise one or more telescoping armatures.

In some examples, armrest plate 102 may include one or more magnets such as magnet 116a-magnet 116d. The one or more magnets may hold the armrest plate 102 to mounting plate 104. In some examples, the armrest plate 102 and plate 104 may be held together based on fit and magnetic force alone. No screws, bolts hold the two together so that a user may detach and attach the armrest plate 102 from the stand 100 manually (e.g., without the use of tools). In some examples, the one or more magnets may be fixed on a bottom portion of mounting plate 104. Mounting plate 104 may include a suitable material (e.g., a metal, plastic, etc.,). In an example, mounting plate 104 may be formed via injection molding. The one or more magnets may be glued or otherwise fixed to the bottom surface of the mounting plate 104 (opposite of the surface that mates with the armrest plate 102.

Figure 2A:
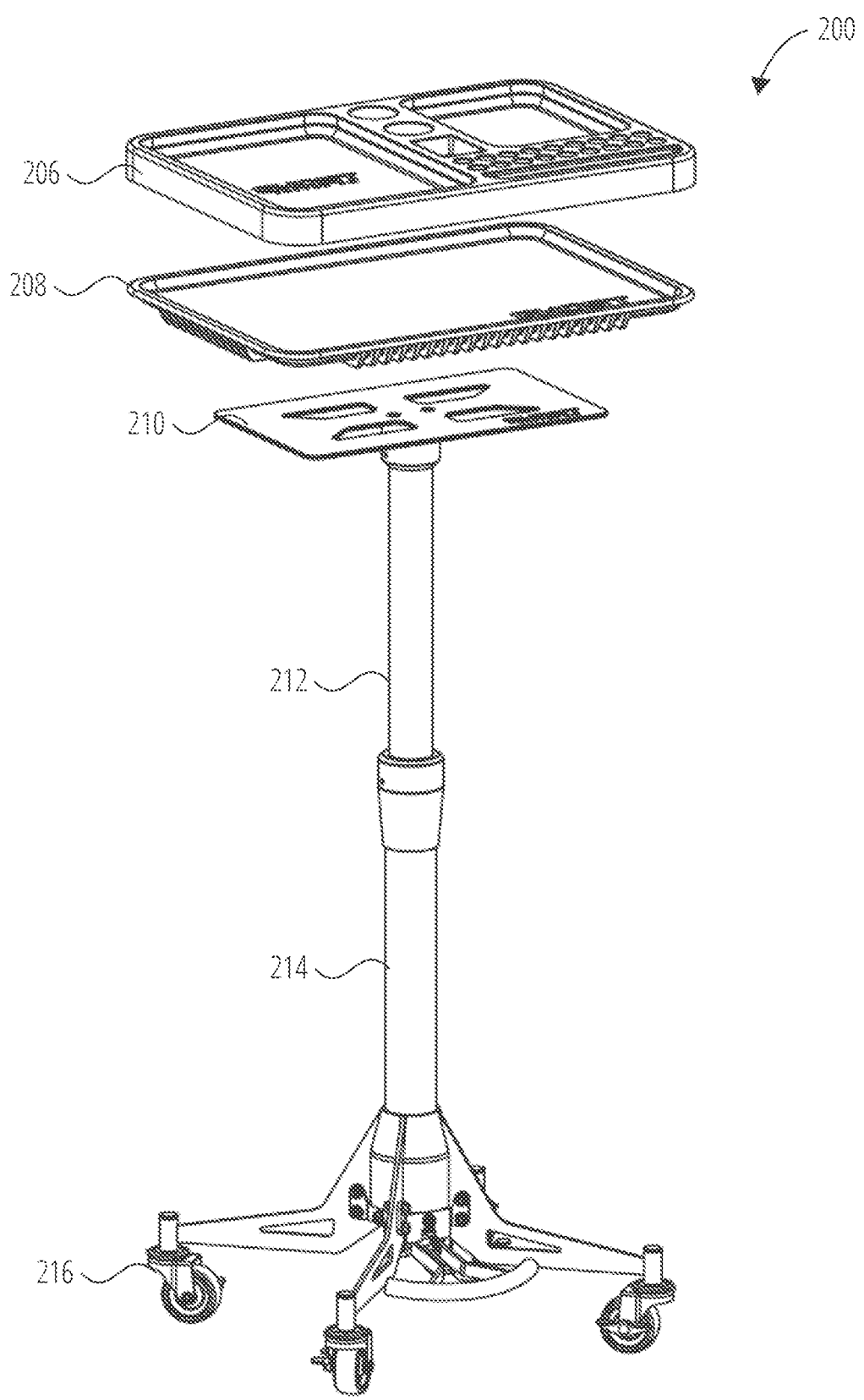
FIG. 2A, FIG. 2B, and FIG. 2C show an adjustable tattoo stand serving as a mayo tray, in accordance with some aspects.
Figure 2B:
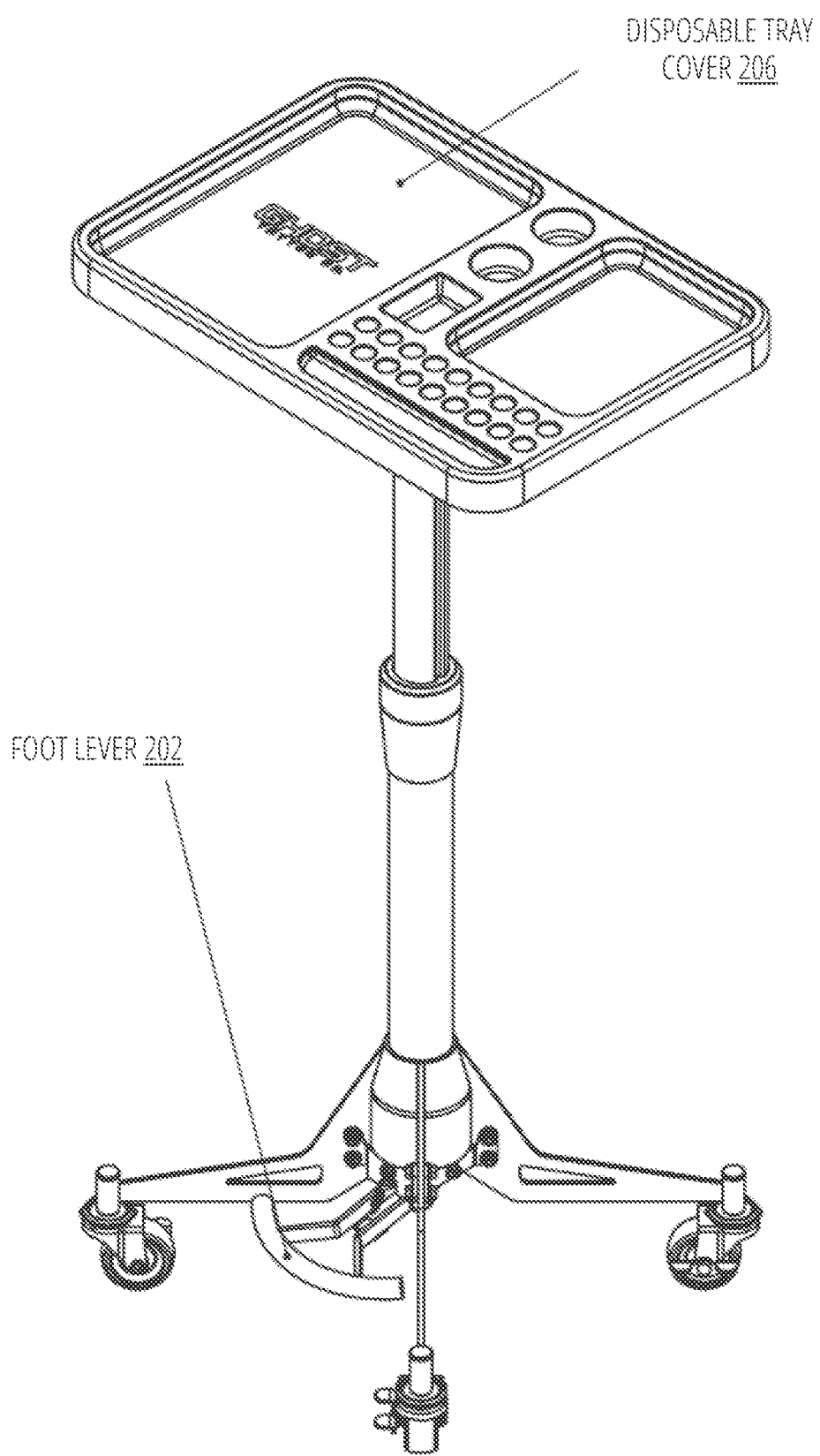
Figure 2C:
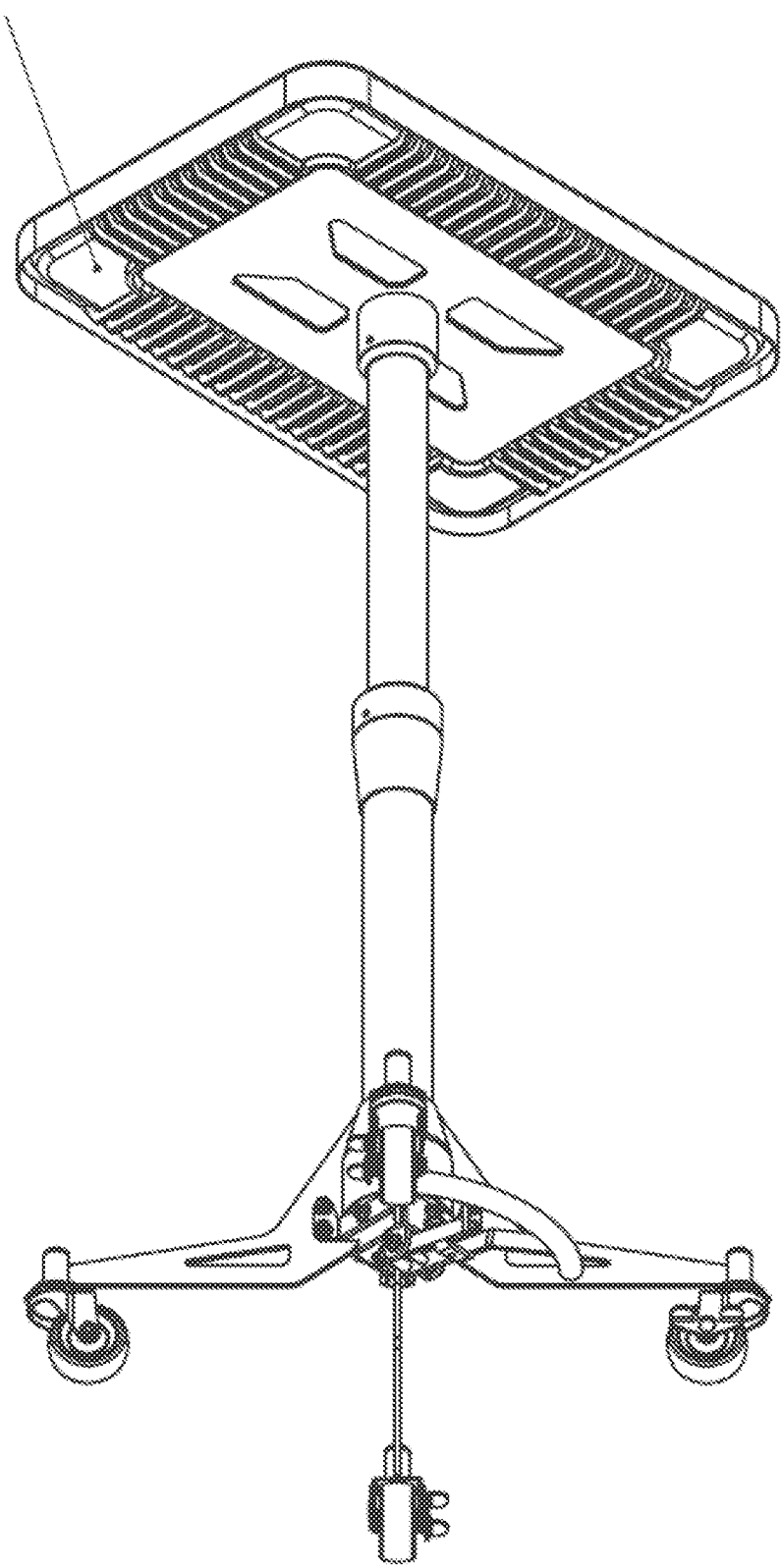

In an embodiment, a user may detach the armrest plate 102 and attach a tray and tray cover, as described with respect to FIG. 2A-FIG. 2C, although not necessarily.

Armrest plate 102 may comprise a magnetic material (e.g., Iron, nickel, cobalt, alloys thereof, or other magnetic material). Mounting plate 104 may include an underside with walls that form a cavity that is complementary to the shape of plate 104. When plate 104 makes contact with the underside portion and magnets 116a-116d hold the plate 104 fixed to armrest plate 102, the armrest plate 102, and the walls or cavity hold armrest plate 102 in place until a force (e.g., a pulling force) pulls the armrest plate 102 away and out of the cavity.

The dimensions of the armrest plate may vary to accommodate different sized humans and different human body parts. In an embodiment, the armrest plate comprises a planar surface having a rectangular shape with at least a width of 10 in and a length of 15 in. In an embodiment, the armrest plate comprises a planar surface having a square shape with at least a width of 12 in.

FIG. 2A, FIG. 2B, and FIG. 2C show an adjustable tattoo stand 200 in accordance with some aspects. Tattoo stand 200 may serve as a tray (e.g., a mayo tray) to hold tattoo equipment during a tattoo operation.

The tattoo stand 200 may include features described with respect to tattoo stand 100. Some of the features shown with respect to tattoo stand 200 may correspond to those discussed with respect to tattoo stand 100, and vice versa. Similarly, some of the features shown in FIG. 2A-FIG. 2C may be combined with those shown in FIG. 1A-FIG. 1D, and vice versa. In some aspects, tattoo stand 200 is the same as tattoo stand 100, but has, in place of the armrest, a disposable tray cover 206 that attaches to a tray 208.

Tattoo stand 200 may comprise a shaft 212, extending upward from base portion 216 which may include one or more feet. In an embodiment, the feet may comprise, respectively, a wheel which may rotate. The shaft 212 may include one or more telescoping arms, which may extend or retract. An actuator 214 may be integrated within the shaft 212 to extend the shaft 212 upon manipulation of a foot pedal, as described. A mounting plate 210 may be fixed to the top portion of shaft 212. The mounting plate 210 may comprise one or more magnets that hold a second plate 208 in place. In another embodiment, the magnets (e.g., 204) are fixed to the second plate 208 rather than the mounting plate 210. This may hold true for an armrest plate as well as a tray plate.

In some embodiments, mounting plate 210 may be fixed rigidly to the shaft portion 212 of the tattoo stand 200. In other examples, mounting plate 210 may be fixed to the shaft through an adjustable member such as adjustable bracket 106 as described with respect to stand 100.

Second plate 208 may comprise a tray shape with raised walls along edges of the tray shape. A disposable tray cover 206 may be attachable and detachable from the top of the tray plate 208. In an aspect, the raised walls extend upward into sleeves along the edges of the disposable tray cover 206, to hold the cover securely in place.

The disposable tray cover 206 may have one or more recessed compartments that include depressions on its top surface to securely hold equipment such as a tattoo machines, tattoo cartridges, ink, 'glide', cotton pads, or other tattoo equipment. The disposable tray cover 206 may attach itself to tray 208 based on fit. It may be attached and removed manually (e.g., without tools). The disposable tray cover 206 and tray 208 may serve as a mayo tray.

The tattoo stand 200 may be adjustable in height, as described with respect to stand 100. For example, stand 200 may include a foot lever 202 and actuator 214 to adjust the height of the stand. In some examples, the tattoo stand 200 may include one or more wheels 216 located respectively at its one or more legs.

In some examples, the height H of stand 100 or 200 may range from 22" to 38". In some examples, the tray dimensions may range from 10"×15" to 14"×20". In some examples, the tray may have dimensions of 12"×17".

In some examples, the armrest plate 102 may have dimensions in the range of 7"×15" to 10" to 18". For example, the armrest may have dimensions of 8.7"×16.7". In some examples, the armrest is padded (e.g., having a cloth, foam, leather, or a soft material or combination thereof.

In an example, the tray shape comprises a width of at least 12" and a length of at least 12".

In some examples, the armrest may be sold as a kit with the adjustable bracket and the armrest, or a second kit with the mayo tray (e.g., the tray and disposable tray cover) without the adjustable bracket. Other embodiments or arrangements of features may be bundled together as a kit.

Figure 3:
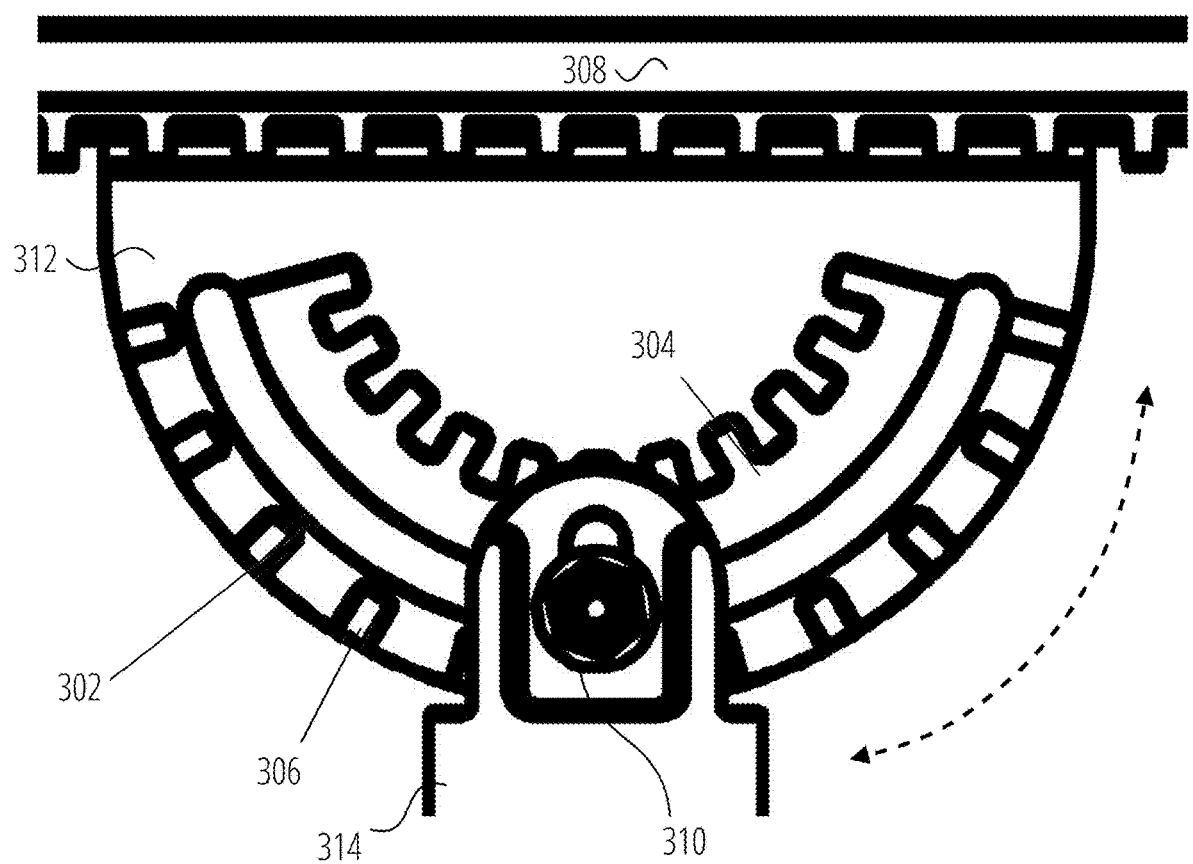
FIG. 3 shows an example of an angle adjustable bracket, in accordance with some embodiments.

FIG. 3 shows an example of an angle adjustable bracket 312, in accordance with some embodiments. The angle adjustable bracket 312 may hold plate 308 to shaft 314. The plate 308 and shaft 314 may correspond to the plate and shaft of stand 100 and stand 200, as described in other sections. For example, plate 308 may attach to an armrest or a tray and disposable tray cover (e.g., with one or more magnets, or based on fit, or both) as described.

In some examples, an angle adjustment may be performed by a user through lifting and shifting the plate 308 (or an attachment fixed upon the plate 308) to a desired angle, and lowering it into place. The bracket may include an arced slot 302. A pin 310 (e.g., a bolt) that is fixed to the shaft 314 may pass through the arced slot and hold the bracket to the shaft.

A first plurality of notches 304 or a second plurality of notches 306, or both, may hold the bracket 312 fixed at that desired angle. The interior notches 304 may be arranged radially at an interior portion of the bracket, and the notches 306 may be arranged radially at outward relative to notches 304. Each of notches 304 may correspond to one of notches 306. Depending on the number of notches, the desired angles may be fixable at 15-degree intervals, or 10-degree intervals, or 5-degree intervals, etc. To adjust the angle again, the user may manually pull the plate 308 out of the notched position, and rotate the plate, and then set it in a different notch at the desired position. One or more first teeth (not shown) may be directly or indirectly fixed to shaft 314. These one or more first teeth may interlock with each of the outer notches (e.g., 304, 306) when dropped in place, and when the plate 308 is lifted, the one or more first teeth remain fixed to the shaft 314 while the bracket 312 is pulled upward thereby releasing the bracket and allowing it to rotate. Similarly, one or more second teeth (not shown) may interlock with the interior notches. The teeth may include protruding members that fit within each notch when the bracket 312 and plate 308 is dropped in place.

Figure 4:
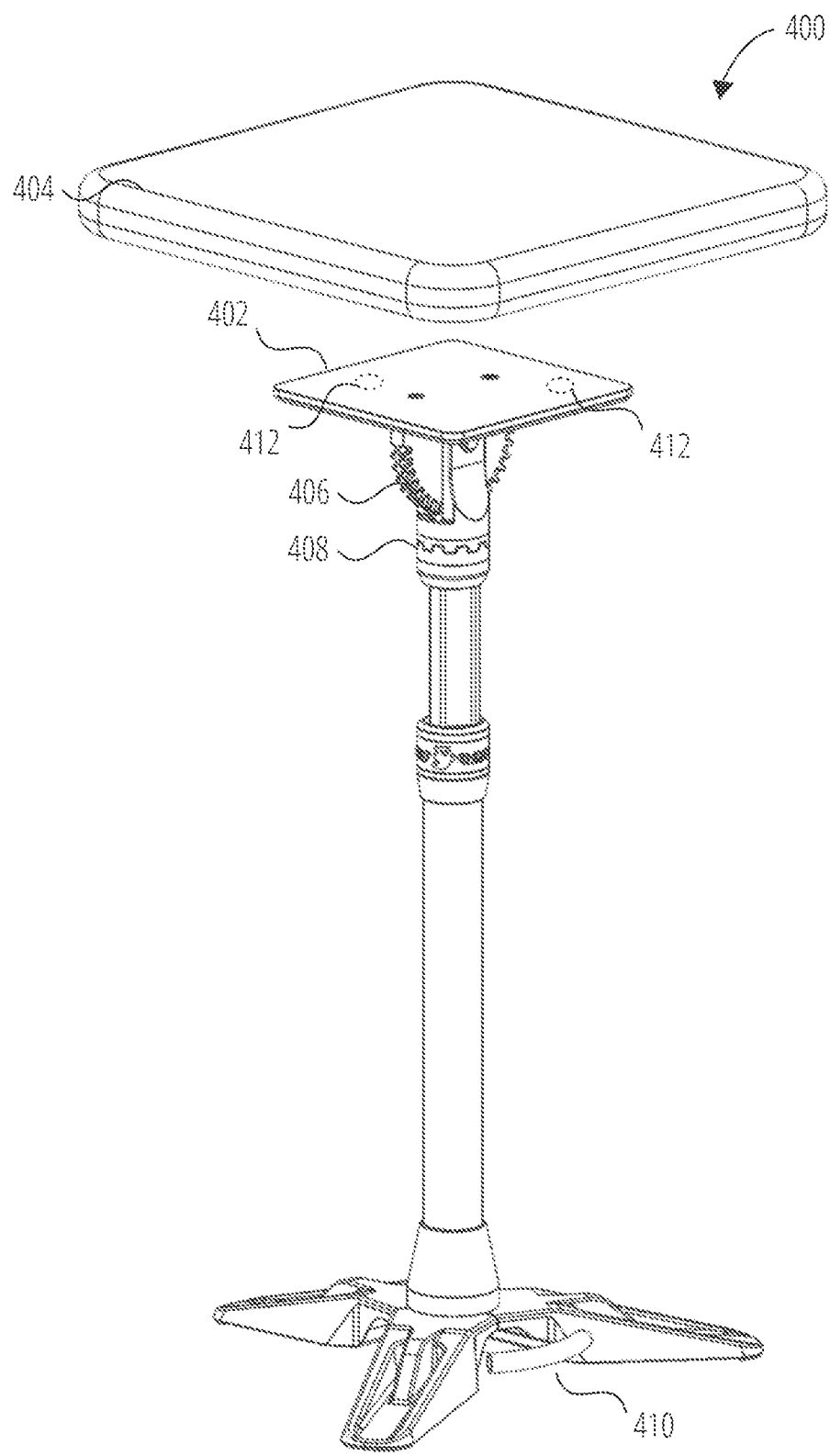
FIG. 4 shows an armrest stand for a tattoo operation, in accordance with some embodiments.
Figure 5:
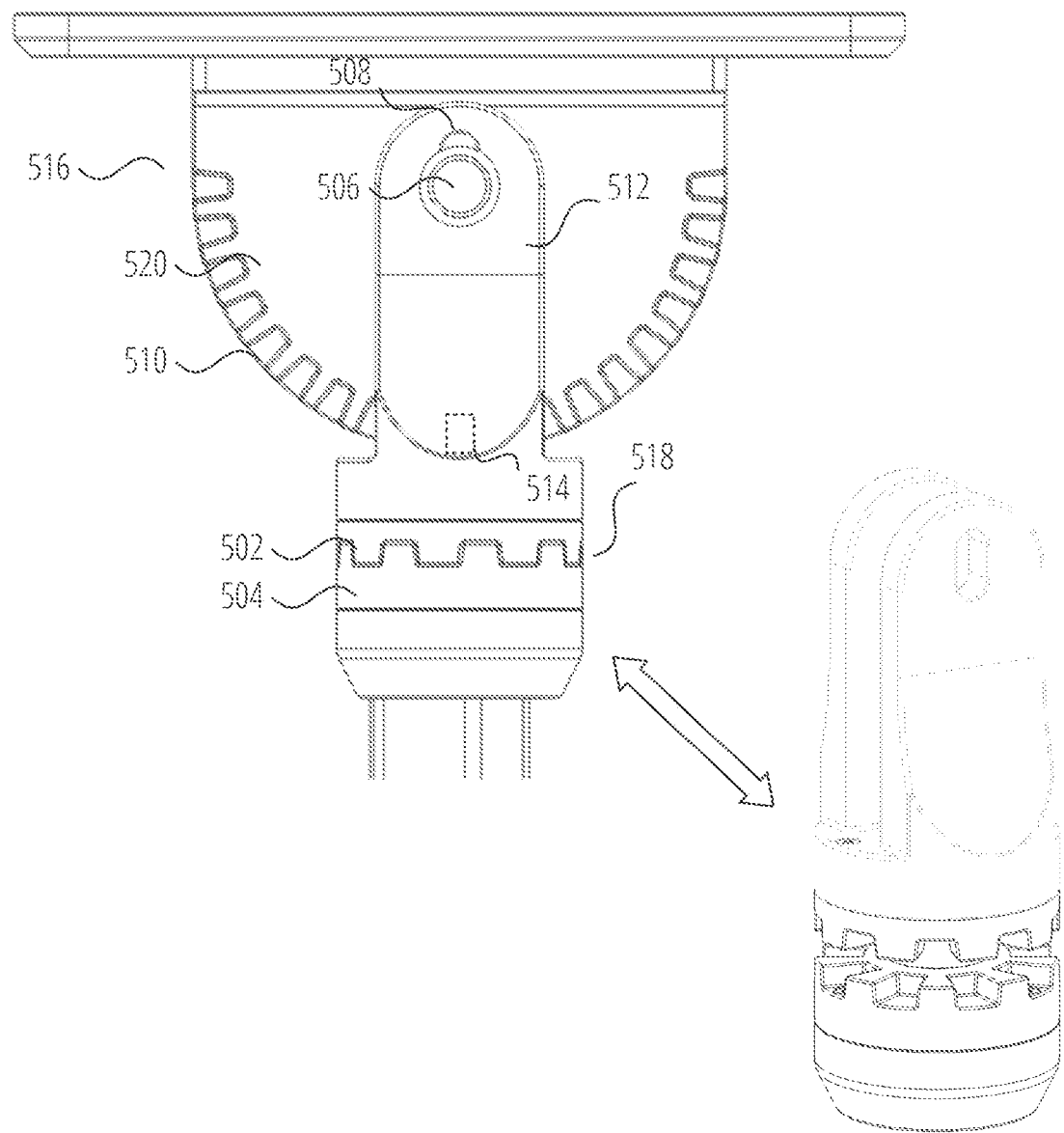
FIG. 5 shows an example of one or more adjustment angles for a tattoo stand, in accordance with an embodiment.

Other embodiments of the angle adjustable bracket may be utilized by the tattoo stand, for example, as shown with respect to FIG. 4 or FIG. 5.

In such a manner, aspects of the present disclosure provide for a modular tattoo stand that may serve as an armrest or a tray for holding a tattoo gun and ink. The angle of the armrest or tray can be adjusted to suit the given tattoo procedure, which may vary depending on the subject's size, the position of the tattoo on the subject's body, and/or other factors.

FIG. 4 shows an armrest stand 400 for a tattoo operation, in accordance with some embodiments. Armrest plate 404 may comprise a magnetic material, as described. Armrest plate 404 may have a planar surface facing upward, to provide a sufficient resting surface for an arm (or other body part). The planar surface may be square, rectangular, oval shaped, or round.

Armrest stand 400 may include a magnetic plate 402 that comprises one or more magnets 412, to hold armrest plate 404. Armrest plate 104 may have an underside, as described in other sections, with a cavity that is complementary in shape to magnetic plate 402, to hold armrest plate 404 fixed securely to magnetic plate 402.

An angle adjustment bracket 406 adjusts a first angle of the armrest plate 404 and magnetic plate 402. The first angle may be referred to as a pitch angle. A second angle adjustment bracket 408 may adjust a second angle of the armrest plate 404. The second angle may be referred to as a yaw angle, or a rotational angle about the axis of the shaft of the stand.

In an embodiment, both the first angle adjustment bracket 406 and the second angle adjustment bracket 408 may be adjustable (e.g., changing angle and locking the surface in place), with one or more forces pulling parts of the shaft or mounting plate, and without requiring manipulation of a latch, lock, screw, fasteners, etc.

Pedal 410 may be operable to adjust the overall height of armrest stand 400.

FIG. 5 shows an example of one or more adjustment angles for a tattoo stand, in accordance with an embodiment.

A first angle adjustable bracket 516 may comprise a series of notches (e.g., 510) that each mate with one or more protruding members 514. For example, first angle adjustment bracket 516 may comprise a respective notch (one of 510) associated with each of the first plurality of locking positions. Each locking position may correspond to a pitch angle of the arm rest surface.

In response to a force (e.g., an upward force) on the mounting bracket or on an upper portion of the first angle adjustable bracket 516, the respective notch disengages with the protruding member to release the first angle adjustable bracket so that its angle may be adjusted freely. In response to the removal of the force, or a second downward force, the protruding member 514 may become arranged in the respective notch to engage with the respective notch and fix the first angle adjustable bracket in place. Thus, by simply lifting the mounting bracket or top portion of the first angle adjustable bracket, a user may adjust the pitch angle of the arm rest.

The first angle adjustable bracket 516 may include a pin 506 that holds a wheel portion 520 of the first angle adjustable bracket to the shaft (e.g., directly or indirectly through second angle adjustable bracket 518). The pin may be inserted in a slot 508 which has play in the vertical direction to allow each notch to engage and disengage with the protruding member 514. The slot 508 may be located on both sides of a fork 512 to hold the wheel portion 520 in a rotatable pivot within the fork 512. In an aspect, the notches are located at an outer radial edge of the wheel portion 520, and the protruding member 514 may include two protruding members on each side of the wheel portion 520.

The second angle adjustable bracket 518 may comprise a top rotating interface 502 and bottom rotating interface 504 with an interlocking shape. For example, the top rotating shape and bottom rotating shape may include a series of up-across-down-across edges that are complementary in geometry such that they interlock with each other when aligned and placed together. In response to a force (e.g., an upward force on the top rotating shape or any components directly or indirectly coupled to the top rotating shape, the top rotating interface and bottom rotating interface separate to release the second angle adjustable bracket (to rotate freely). A user may rotate the top rotating interface freely (about the axis of the shaft), and then place the top rotating interface on the bottom rotating interface in an interlocked position, to hold it at the desired rotational angle.

The combined angle adjustment brackets, along with the height adjustment, give a tattoo artist improved freedom to operate on a patient during a single operation in various poses or positions, reducing the need to move furniture around during the operation. Further, given the sensitivity of a tattoo environment, because the angle adjustment brackets may be operated without knobs, screws, fasteners, etc., a tattoo operator can simply lift the mounting plate or a portion of the top bracket to adjust either angle, thereby reducing the need to remove gloves, re-sanitize, empty the hands of equipment, etc.

Figure 6A:
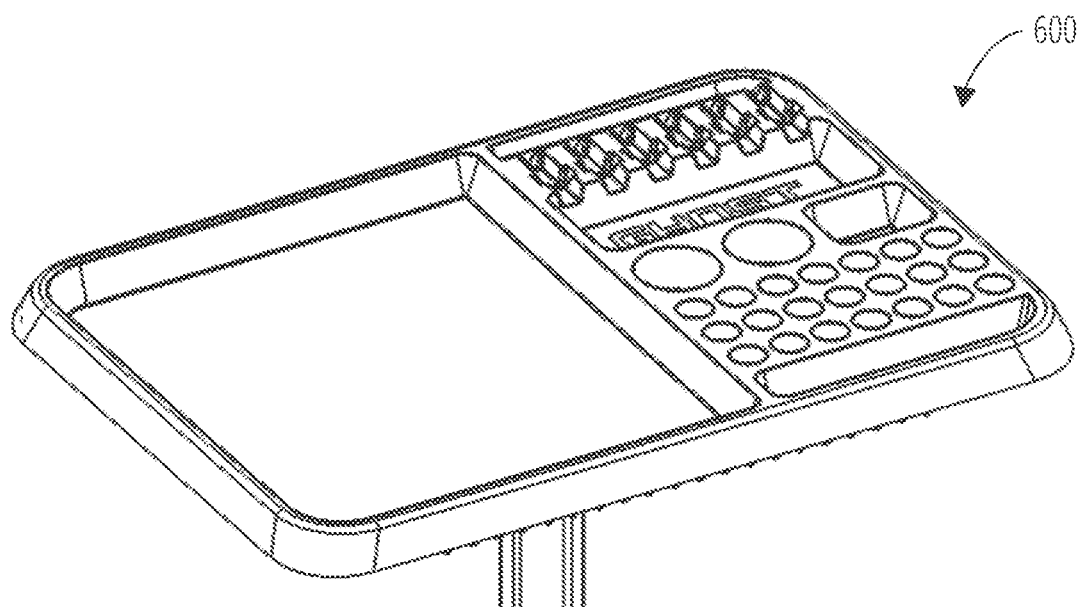
FIG. 6A and FIG. 6B show views of an example disposable tray cover, in accordance with an embodiment.
Figure 6B:
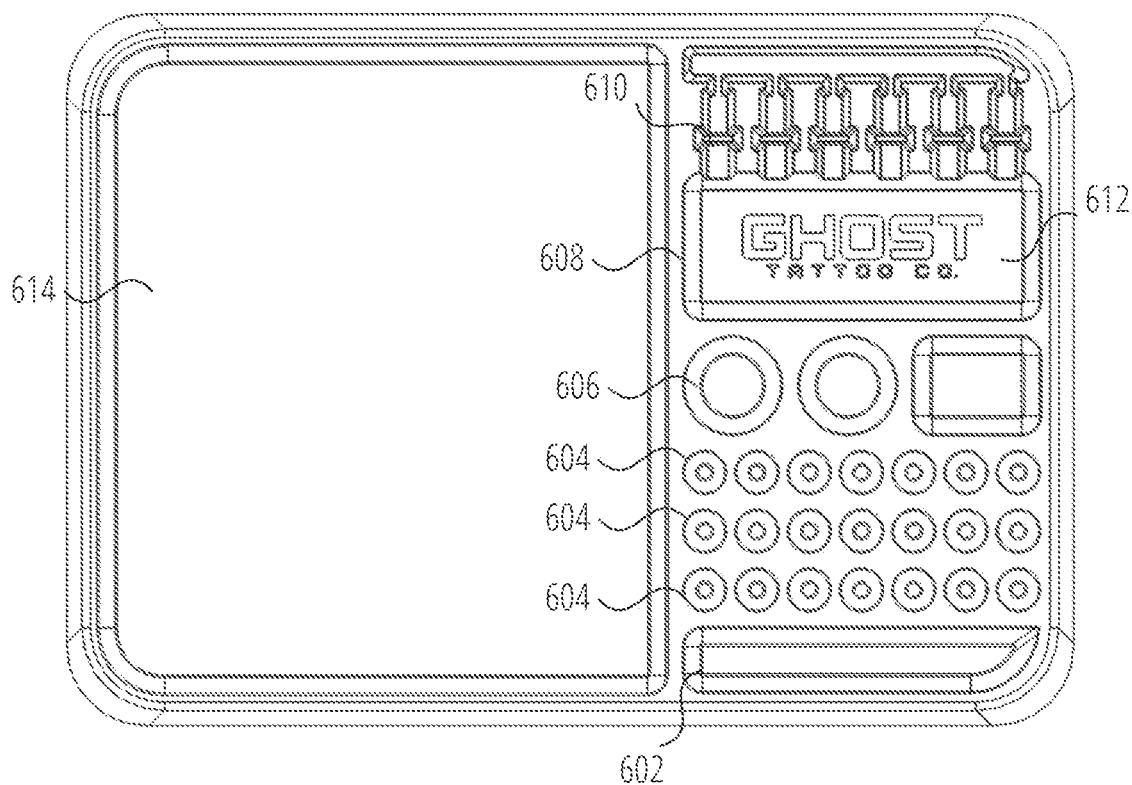

FIG. 6A and FIG. 6B show views of an example disposable tray cover, in accordance with some aspects. A disposable cover 600 is shown that is attachable and removable from a tattoo stand (e.g., from the second plate).

The disposable cover 600 may comprise a plurality of recesses (e.g., 602, 604, 606, 612, 614) of varying shape and size, serving as compartments for different tattoo equipment. In an example, the plurality of recesses comprise at least a depth of 0.3 in.

In an example, the plurality of recesses comprises a first elongated recess 602, which may serve as a compartment for 'glide'. Glide is a lubricant for the skin that can be applied before, during, and after tattoo operation. In an embodiment, the recess 602 may at least a length of 3 in, and at least a width of 0.3 in.

In an embodiment, the plurality of recesses may comprise a second plurality of recesses (e.g., round or rectangular recesses 604 or 606) ranging from 0.5 to 1.5" in length, width, or diameter.

In an embodiment, the recesses (e.g., 612) may form a compartment for one or more tattoo needle cartridges. For example, one or more third recesses 612 comprising a first recess portion 608 that is fluidly connected to a plurality of second recess portions 610. The second recess portions may have a geometry that is complementary in shape to a tattoo needle cartridge to hold the tattoo needle cartridge in place in the one or more third recesses. For example, the second recess portions 610 may each include a slender neck cavity with one or more ridges to hold a tattoo needle cartridge in place. The first recess portion 608 may be larger to accommodate a human hand so that the hand may position itself beside and under a portion of the recess portions 610 to remove or place the cartridge.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive or.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion.

What is claimed is:

1. A stand for tattoo operation, comprising:
a base;
a shaft attached to the base at a bottom portion of the shaft;
a mounting plate fixed to a top portion of the shaft, the mounting plate comprising one or more magnets;
a second plate, comprising a magnetic material, attachable and detachable from the mounting plate;
a first angle adjustable bracket, coupled to the shaft and the mounting plate, the first angle adjustable bracket including a first plurality of locking positions, each corresponding to a respective pitch angle of the second plate upon setting of the first angle adjustable bracket; and
a second angle adjustable bracket, coupled to the shaft and the mounting plate, the second angle adjustable bracket including a second plurality of locking positions that each correspond to a respective rotational angle of the second plate upon setting of the second angle adjustable bracket.

2. The stand of claim 1, wherein the second plate comprises an armrest plate.

3. The stand of claim 2, wherein the first angle adjustable bracket and the second angle adjustable bracket are adjustable in response to a force, and are fixed in place in response to a removal of the force.

4. The stand of claim 3, wherein the first angle adjustable bracket comprises a respective notch associated with each of the first plurality of locking positions, wherein in response to the force, the respective notch disengages with a protruding member to release the first angle adjustable bracket, and in response to the removal of the force, the protruding member becomes arranged in the respective notch to engage with the respective notch to fix the first angle adjustable bracket in place.

5. The stand of claim 4, wherein the second angle adjustable bracket comprises a top rotating interface and bottom rotating interface with an interlocking shape, wherein in response to the force, the top rotating interface and bottom rotating interface separate to release the second angle adjustable bracket.

6. The stand of claim 2, wherein the armrest plate comprises a planar surface having a rectangular shape with at least a width of 10 in and a length of 15 in.

7. The stand of claim 2, wherein the armrest plate comprises a planar surface having a square shape with at least a width of 12 in.

8. The stand of claim 1, wherein the second plate comprises a tray shape comprising raised walls along edges of the tray shape.

9. The stand of claim 8, further comprising: a disposable cover that is attachable and removable from the second plate.

10. The stand of claim 9, wherein the disposable cover comprises a plurality of recesses.

11. The stand of claim 8, wherein the tray shape comprises a width of at least 12 in. and a length of at least 12 in.

12. The stand of claim 8, wherein the tray shape comprises at least one of: rectangle, a square, an oval, or a circle shape.

13. The stand of claim 1, further comprising:
a pedal, coupled to the base; and
an actuator, coupled to the pedal, wherein in response to a depression of the pedal, the actuator generates a force that extends a length of the shaft that increases a height of the stand.

14. The stand of claim 12, wherein the actuator comprises a gas strut comprising a piston that is coupled to the shaft.

15. The stand of claim 1, wherein the base has a shelf or a plurality of feed that extend from a center axis of the base.

16. A stand for tattoo operation, comprising:
a base;
a shaft attached to the base at a bottom portion of the shaft;
a mounting plate fixed to a top portion of the shaft, the mounting plate comprising one or more magnets;
a second plate, comprising a magnetic material, attachable and detachable from the mounting plate, wherein the second plate comprises a tray shape comprising raised walls along edges of the tray shape; and
a disposable cover that is attachable and removable from the second plate, wherein the disposable cover comprises a plurality of recesses.

17. The stand of claim 16, wherein the plurality of recesses comprise a first elongated recess having at least a length of 3 in, and at least a width of 0.3 in.

18. The stand of claim 16, wherein the plurality of recesses comprise a second plurality of round recesses ranging between 0.5 and 1 in in diameter.

19. The stand of claim 17, wherein the plurality or recesses comprise one or more third recesses comprising a first recess portion that is fluidly connected to a plurality of second recess portions, and wherein each of the second recess portions have a geometry that is complementary in shape to a tattoo needle cartridge to hold the tattoo needle cartridge in the one or more third recesses.

20. The stand of claim 18, wherein the plurality of recesses comprise at least a depth of 0.3 in.

* * * * *